US 12,037,049 B1

(12) United States Patent
Wright

(10) Patent No.: US 12,037,049 B1
(45) Date of Patent: Jul. 16, 2024

(54) UTILITY TRAILER APPARATUS

(71) Applicant: Brian Wright, Fairhope, AL (US)

(72) Inventor: Brian Wright, Fairhope, AL (US)

(*) Notice: Subject to any disclaimer, the term of this patent is extended or adjusted under 35 U.S.C. 154(b) by 0 days.

(21) Appl. No.: 17/982,152

(22) Filed: Nov. 7, 2022

Related U.S. Application Data

(60) Provisional application No. 63/276,215, filed on Nov. 5, 2021.

(51) Int. Cl.
| | | |
|---|---|---|
| B62D 33/03 | (2006.01) | |
| B60P 1/43 | (2006.01) | |
| B60P 3/40 | (2006.01) | |
| B62D 33/027 | (2006.01) | |
| B62D 63/06 | (2006.01) | |

(52) U.S. Cl.
CPC .............. *B62D 33/03* (2013.01); *B60P 3/40* (2013.01); *B62D 33/0273* (2013.01); *B62D 63/062* (2013.01); *B60P 1/435* (2013.01)

(58) Field of Classification Search
CPC . B60P 1/435; B60P 3/40; B62D 33/03; B62D 33/0273; B62D 63/062
See application file for complete search history.

(56) References Cited

U.S. PATENT DOCUMENTS

| | | | |
|---|---|---|---|
| 4,516,308 A | 5/1985 | Urban | |
| 4,767,150 A | 8/1988 | Hall | |
| 6,817,653 B2 | 11/2004 | Ropp | |
| 6,964,427 B2 | 11/2005 | Chumley | |
| 7,309,094 B2 | 12/2007 | Norfleet | |
| 7,380,873 B2 | 6/2008 | Shoemaker | |
| 7,484,783 B2 | 2/2009 | Jager | |
| 7,591,497 B2 | 9/2009 | Johns | |
| 7,651,147 B2 | 1/2010 | Eidsmore | |
| 7,677,626 B2 | 3/2010 | Hanzel | |
| 7,789,452 B2 | 9/2010 | Dempsey et al. | |
| 8,082,698 B2 | 12/2011 | Drake | |
| 8,590,962 B2 | 11/2013 | Nye et al. | |
| 9,073,590 B2 | 7/2015 | Fox et al. | |
| D736,676 S | 8/2015 | Ehrgott | |
| 2003/0173758 A1 | 9/2003 | Badger et al. | |
| 2004/0253071 A1 | 12/2004 | Floe | |
| 2007/0045993 A1 | 3/2007 | Jager | |
| 2011/0090072 A1 | 4/2011 | Haldeman | |
| 2011/0198824 A1 | 8/2011 | Markovich | |
| 2011/0260430 A1* | 10/2011 | Markovich | .......... B62D 63/062 296/26.11 |
| 2012/0193942 A1 | 8/2012 | Nye et al. | |
| 2012/0267404 A1 | 10/2012 | Rottinghaus et al. | |

* cited by examiner

*Primary Examiner* — Amy R Weisberg
*Assistant Examiner* — Matthew Joseph Ganci
(74) *Attorney, Agent, or Firm* — Baker Donelson Bearman Caldwell & Berkowitz PC

(57) ABSTRACT

A trailer chassis having multiple wheels attached to one or more axels and a bed area. A main gate movably attached to the chassis at the rear edge portion of the bed area and being movable between elevated and lowered positions The main gate having upper and lower edge portions and left and right gate side edges. A cutout or open portion of the main gate providing a gap or recess or opening for enabling carriage of elongated articles above the load carrying area that are longer than the bed length. An auxiliary gate that is smaller than the main gate, the auxiliary gate being movable between an auxiliary gate closed position that covers the gap or recess or opening and an auxiliary gate open position that enables articles to occupy the gap or recess or opening.

18 Claims, 6 Drawing Sheets

UTILITY TRAILER APPARATUS

CROSS-REFERENCE TO RELATED APPLICATIONS

Priority of U.S. Provisional Patent Application Ser. No. 63/276,215, filed 5 Nov. 2021, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved utility trailer with a specially configured main loading gate that enables carriages of elongated articles (e.g., pipe, lumber, tubing), wherein a recess portion of the gate can be opened or closed with an auxiliary gate that is smaller than the main gate.

2. General Background of the Invention

Utility trailers are commonly fitted with one or more loading gates. Usually, a utility trailer has a rear loading gate movable between open and closed positions. Some specialized utility trailers referred to as landscape trailers can have two or more gates, a rear gate and one or more side gates. Such utility trailers are commercially available (e.g., www.bigtextrailers.com).

Utility trailers can be used to haul lawn care vehicles or farm equipment such as tractors, lawn mowers, all terrain vehicles. However, elongated articles such as pipe, tubing, sections, and some lumber can be too long for the trailer chassis. Most utility trailers are about 10-18 feet long whereas lumber or pipe can be longer. For example, pipe joints are commonly about twelve-twenty (12-20) feet long as an example.

The following possibly relevant U.S. patents and Publications are hereby incorporated herein by reference:

| PAT. NO. | TITLE | ISSUE DATE |
|---|---|---|
| 4,516,308 | PORTABLE WORKSHOP | May 14, 1985 |
| 4,767,150 | TRAILER AND TAILGATE | Aug. 30, 1988 |
| 6,817,653 | FULL ACCESS MODULAR UTILITY TRAILER | Nov. 16, 2004 |
| 6,964,427 | TRAILER ACCESSIBLE FROM EACH END AND METHOD | Nov. 15, 2005 |
| 7,309,094 | UTILITY TRAILER TAILGATE ARRANGEMENT | Dec. 18, 2007 |
| 7,380,873 | COVERED UTILITY TRAILER AND KIT FOR ASSEMBLING SAME | Jun. 3, 2008 |
| 7,484,783 | TRAILER WITH DUAL POSITION FRONT GATE | Feb. 3, 2009 |
| 7,591,497 | UTILITY TRAILER | Sep. 22, 2009 |
| 7,651,147 | CARGO HAULING SYSTEM | Jan. 26, 2010 |
| 7,677,626 | MULTI-FUNCTIONAL VEHICLE TAILGATE | Mar. 16, 2010 |
| 7,789,452 | RECONFIGURABLE TRAVEL TRAILER | Sep. 7, 2010 |
| 8,082,698 | MODULAR ENCLOSURE FOR UTILITY TRAILERS AND PICKUP TRUCKS | Dec. 27, 2011 |
| 8,590,962 | TRAILER WITH MULTI-POSITION PANELS | Nov. 26, 2013 |
| 9,073,590 | TRAILER | Jul. 7, 2015 |
| 2003/0173758 | TENT ASSEMBLY FOR USE WITH UTILITY TRAILERS AND VEHICLES | Sep. 18, 2003 |
| 2004/0253071 | TRAILER STRUCTURES | Dec. 16, 2004 |
| 2007/0045993 | TRAILER WITH THREE POSITION TAILGATE | Mar. 1, 2007 |
| 2011/0090072 | AUXILIARY TOW LIGHTING WITH VERSATILE GRIPPING APPARATUS AND METHOD | Apr. 21, 2011 |
| 2011/0198824 | UTILITY TRAILER | Aug. 18, 2011 |
| 2011/0260430 | UTILITY TRAILER WITH EXTENDABLE CARGO BED | Oct. 27, 2011 |
| 2012/0193942 | TRAILER WITH MULTI-POSITION PANELS | Aug. 2, 2012 |
| 2012/0267404 | MODULAR VEHICLE-MOUNTED STORAGE SYSTEM | Oct. 25, 2012 |
| D736,676 | TRAILER RAMP | Aug. 18, 2015 |

BRIEF SUMMARY OF THE INVENTION

The present invention provides a utility trailer with improved loading gate (or ramp) having a recess that can be occupied by elongated articles. A main gate can be opened (lowered) when loading a vehicle, such as a lawn mower, to the trailer load bed. The main gate has a recess that can be occupied by an elongated article (e.g., pipe). An auxiliary gate closes the recess of the main gate when elongated articles are not being carried such as when loading a vehicle (e.g., tractor, lawn mower, all terrain vehicle, motorcycle).

In one embodiment, the present invention includes a utility trailer apparatus having a trailer chassis having a central longitudinal axis, one or more axels, multiple wheels preferably attached to the one or more axels, a bed area having a front edge portion, rear edge portion and opposed left and right side edge portions, the bed area having a load carrying surface, each side edge portion having an elevated side portion. The trailer apparatus bed area has a bed length and a bed width. A main gate can be movably attached to the chassis at the rear edge portion of the bed area. The main gate can be movable between elevated and lowered positions, wherein in the elevated position the main gate can be attachable to one or both of the elevated side portions. The main gate can have upper and lower edge portions and left and right gate side edges. A cutout portion of the main gate provides a gap or recess for enabling carriage of articles above the load carrying area that are longer than the bed length, wherein the gap or recess enables carriage of articles that extend in front of and behind the main gate when the articles occupy the gap or recess.

An auxiliary gate that can be smaller than the main gate. The auxiliary gate can be movable between an auxiliary gate closed position that covers the gap or recess and an auxiliary gate open position that enables elongated articles (e.g., pipe, lumber, tubing, or the like) to occupy the gap or recess.

In one or more embodiments, the movable gate can be removably or pivotally attached to the chassis.

In one or more embodiments, the auxiliary gate can be spaced inwardly of the left and right side edges.

In one or more embodiments, the auxiliary gate can extend from the main gate upper edge a partial distance toward the main gate lower edge.

In one or more embodiments, the auxiliary gate can be movably or pivotally attached to the main gate.

In one or more embodiments, the gap or recess can be generally rectangular.

In one or more embodiments, a load carrying beam on the main gate is positioned below the gap or recess.

In one or more embodiments, the gap or recess can be positioned at the central longitudinal axis.

In one or more embodiments, the auxiliary gate can be elevated above the load carrying surface.

In one embodiment of the present invention there is provided a utility trailer apparatus having a trailer chassis having a frame and a load carrying bed, the frame having a front end portion, a rear end portion and side walls.

A main gate attaches to the frame, the main gate preferably having a lower end, a top end and side ends, wherein the main gate lower end can be pivotally connected to the trailer rear end portion and can be moved between an elevated position and a lowered position. The main gate preferably has a height that extends higher than the trailer side walls. A cut out portion can be provided at the top end of the main gate that preferably enables carriage of elongated articles that are positioned above the load carrying bed and wherein the elongated articles extend past or beyond the trailer rear end portion.

An auxiliary gate can be connected to the main gate and can be moveable between opened and closed positions, and wherein the auxiliary gate covers the cut out portion when placed in the closed position.

The elongated articles can extend through the cut out portion when the auxiliary gate is in the opened position.

A preferred embodiment of the present invention includes a utility trailer apparatus provides a trailer chassis preferably having one or more axels having wheels, a frame and a load carrying bed, the frame having a front end portion, a rear end portion and side walls.

A main gate preferably has a lower end, a top end and side ends, wherein the main gate lower end can be pivotally connected to the trailer rear end portion and can be moved between an elevated position and a lowered position.

An opening can be provided at the top end of the main gate that preferably enables carriage of elongated articles that are positioned above the load carrying bed and wherein the articles extend past the trailer rear end portion.

An auxiliary gate can be connected to the main gate and can be moveable between opened and closed positions, and wherein the auxiliary gate preferably covers the opening when placed in the closed position.

A portion of the articles can rest on the load carrying bed and a portion of the articles extend through the opening in an elevated position when the auxiliary gate is in the open position.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
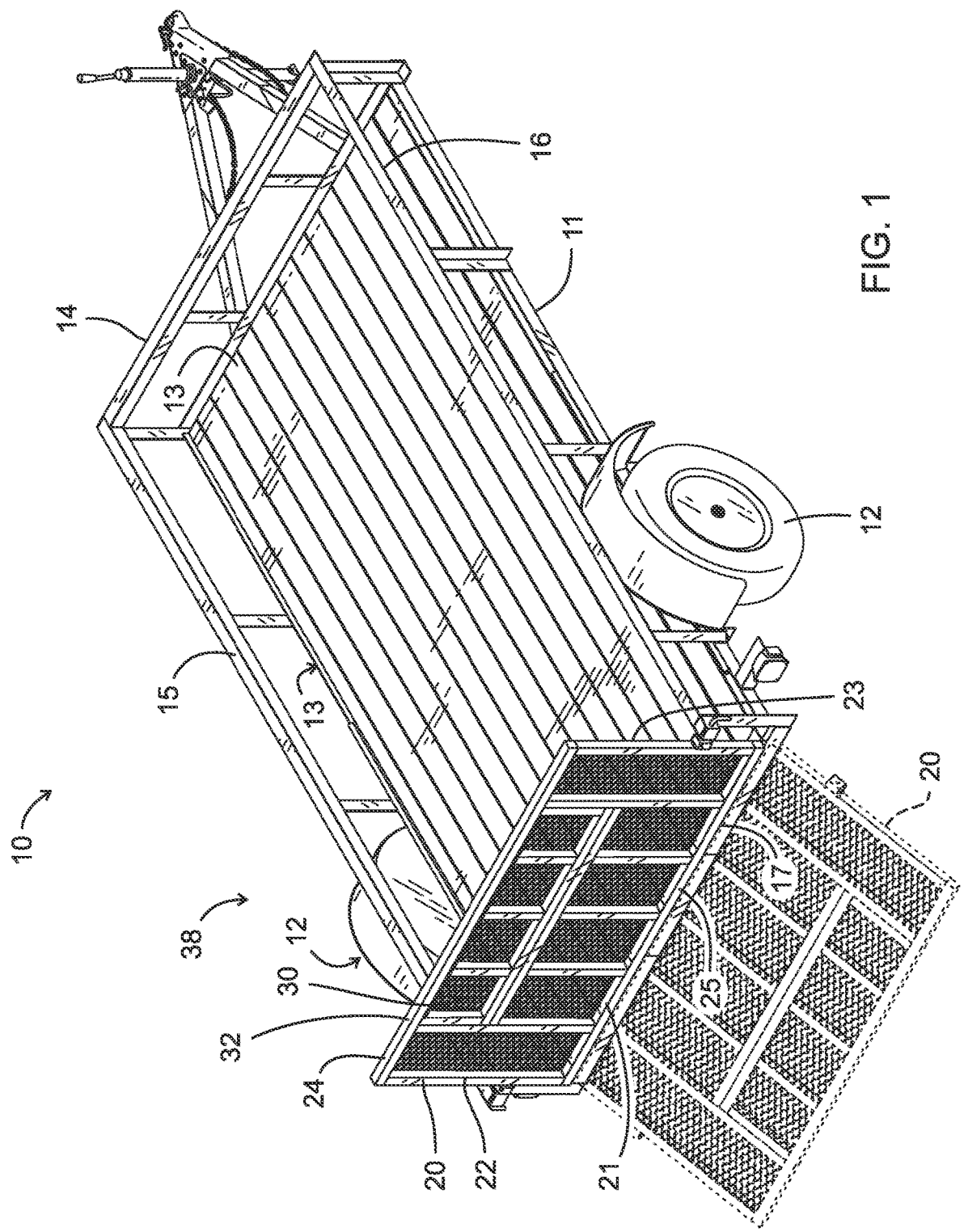
FIG. 1 is a perspective view of a preferred embodiment of the apparatus of the present invention.

FIGS. 1-9 show utility trailer 10 having an improved loading gate/ramp arrangement. Trailer 10 has a chassis 11 (e.g., welded steel or welded aluminum construction) provided with tongue 19 for enabling connection to a tow vehicle. Chassis 11 can be wheeled, preferably having two wheels 12 on a single axle or can be a tandem axle trailer with four wheels. Chassis 11 can have a load carrying bed 13 that can be wood planks or beams bolted or connected to the welded metal frame of chassis 11. Guards, walls or rails 14, 15, 16 can be provided at the front end and sides of chassis 11. Such walls, rails, sides or guards 14, 15, 16 keep guard against inadvertent loss of cargo. The sides, rails, walls, or guards 14, 15, 16 can be solid walls or pipe or beams that can be supported upon vertical posts. Side wall 14 is a forward wall/rail/guard. Sides 15, 16 are side walls, rails or guards. Chassis 11 has a rear edge 17 to which main gate/ramp 20 can be pivotally attached at pivotal connectors/hinges 18. In this fashion, main gate 20 can be lowered to form a ramp for enabling loading of a vehicle (e.g., mower, tractor, ATV), as seen in FIG. 1 in dashed lines. Gate 20 can be elevated after the selected vehicle or other item has been loaded, as seen in FIG. 1. Gate 20 can then be secured in the closed position with latches, clasps or rings 34 (commercially available).

Main gate 20 has lower edge portion 21, side portions 22, 23 and upper edge portion 24. Main gate 20 can be made of welded steel (or aluminum), having lower horizontal beam 25, middle horizontal beam 41, vertical beams 26 and upper horizontal beam 32 and can be covered with a sheet or sheets 36 of expanded metal.

Main gate 20 has a cut out or recess portion 27. Beam 24 can be provided above recess, cut out or opening 27. Recess or cut out portion or opening 27 can be closed with auxiliary gate 30. Recess 27 is defined by lower recess beam 28 to which auxiliary gate 30 can be pivotally attached at pivot or hinge 29. In another embodiment, auxiliary gate could be removable and attachable with multiple locks or other connectors.

Auxiliary gate 30 has lower horizontal beam 28, upper horizontal beam 31 and multiple vertical beams 33. Auxiliary gate 30 can be movable between opened 37 and closed 38 positions. One or more latches 35 or locks 42 can be provided to secure auxiliary gate 30 in the closed 38 position. Lock 42 can be a spring loaded self-locking device as seen in FIGS. 6-9 for example. Lock 42 can have handle 43, pin 46, cover 45 and plate 47. Plate 47 and cover 45 can be mounted on beam 26 of main gate 20. Keeper 44 can be mounted on beam 33 of gate 30. In a closed position 38, handle 43 can be pulled away from keeper 44 to unlock auxiliary gate 30 into an opened position 37. Auxiliary gate 30 preferably opens inward. When auxiliary gate 30 is placed in a closed position 38, lock 42 can preferably automatically self-lock with a spring loaded action. Cover 45 can be preferably about 1⅝" wide and 2" long. Pin 46 can preferably be about 7/16" wide and 7/16" long. Handle 43 can extend laterally about 1¼" away from gate 30. Such latches 35 are commercially available. Such locks 42 are commercially available (see www.paneloc.com). Any of the beams can be square tubing, flanged beams or angle iron beams.

Figure 2:
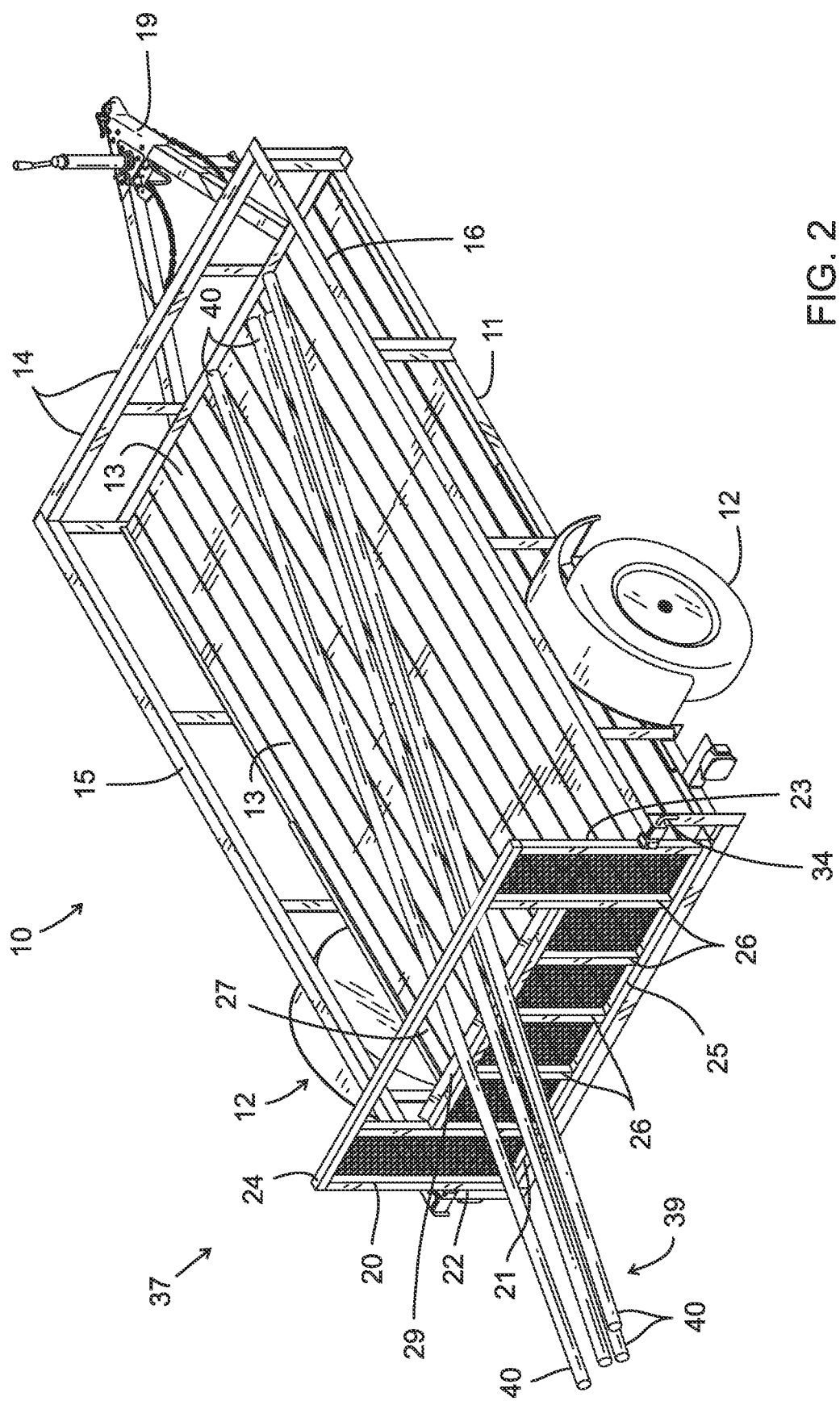
FIG. 2 is a perspective view of a preferred embodiment of the apparatus of the present invention.
Figure 3:
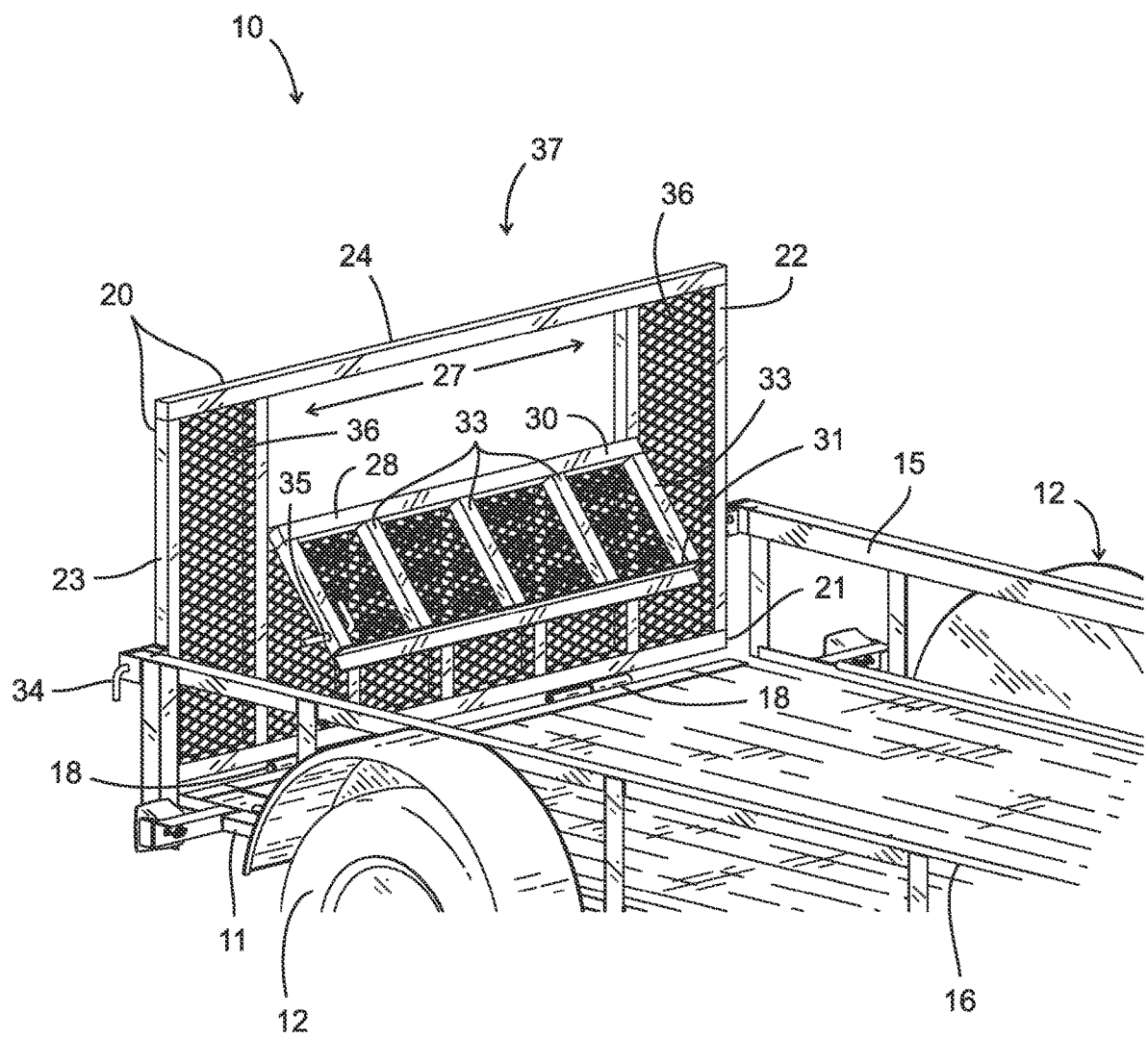
FIG. 3 is a partial perspective view of a preferred embodiment of the apparatus of the present invention.
Figure 4:
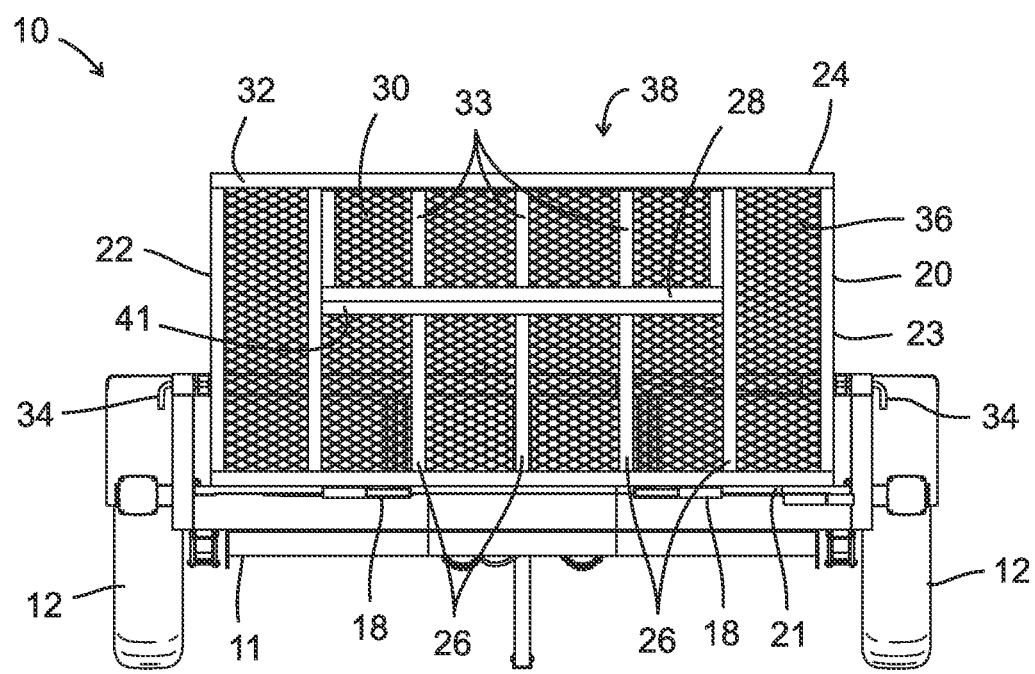
FIG. 4 is a rear fragmentary view of a preferred embodiment of the apparatus of the present invention.
Figure 5:
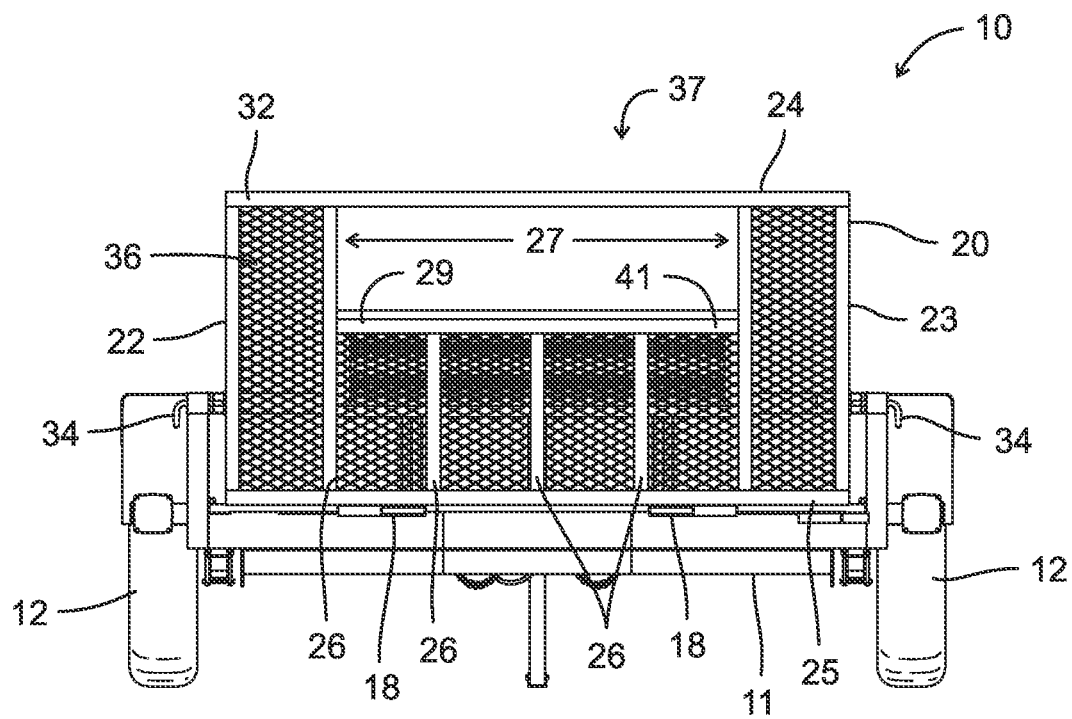
FIG. 5 is a rear fragmentary view of a preferred embodiment of the apparatus of the present invention.
Figure 6:
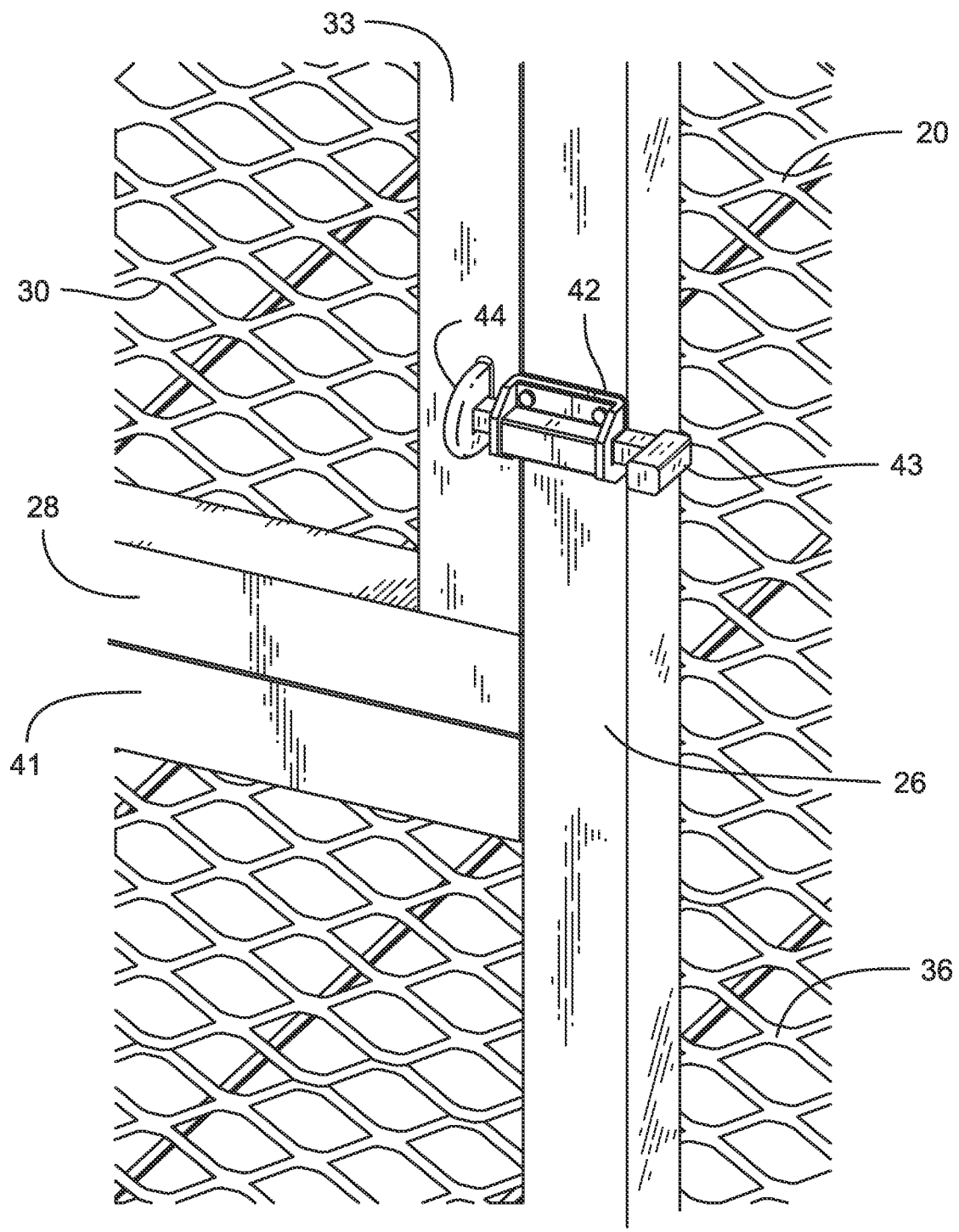
FIG. 6 is a partial perspective view of a preferred embodiment of the apparatus of the present invention showing a lock.
Figure 7:
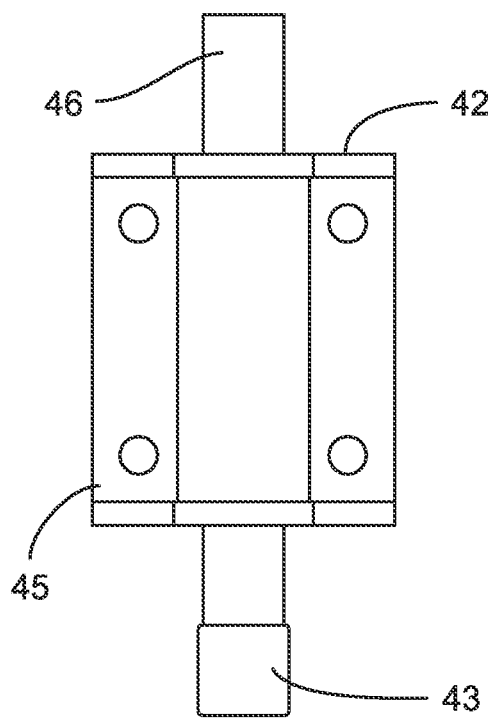
FIG. 7 is a top fragmentary view of a preferred embodiment of the apparatus of the present invention showing a lock.
Figure 8:
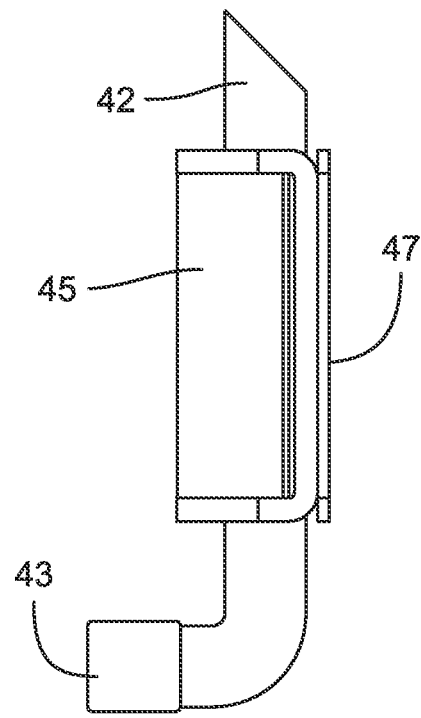
FIG. 8 is a side fragmentary view of a preferred embodiment of the apparatus of the present invention showing a lock.
Figure 9:
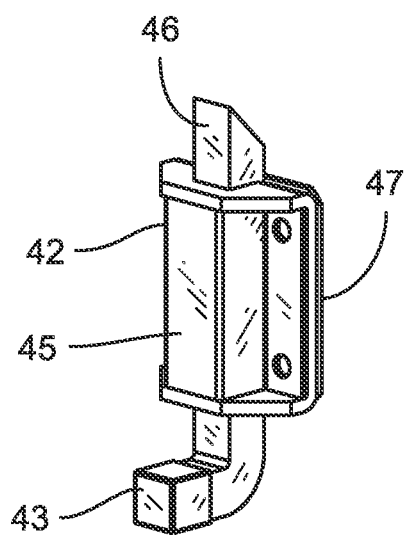
FIG. 9 is a perspective fragmentary view of a preferred embodiment of the apparatus of the present invention showing a lock.

When carriage of one or more elongated articles 40 is desired, main gate 20 is closed. Auxiliary gate 30 is opened. Beam 28 preferably becomes a load carrying beam for articles 40, such as pipe, lumber, tubing or the like. One end of each elongated article 40 rests on trailer load carrying bed 13 while beam 28 supports the article or articles 40 as seen in FIG. 2. In FIG. 2, each elongated article 40 can be in an inclined position with one end of each article 40 resting on bed 13 and another portion of each article 40 resting on beam 41. Recess 27 enables a portion 39 of the elongated articles to extend rearwardly of main gate 20.

The following is a list of parts and materials suitable for use in the present invention:

PARTS LIST

| PART NUMBER | DESCRIPTION |
| --- | --- |
| 10 | utility trailer |
| 11 | chassis |
| 12 | wheel |
| 13 | load carrying bed |
| 14 | forward wall/rail/guard |
| 15 | side wall/rail/guard |
| 16 | side wall/rail/guard |
| 17 | chassis or bed rear edge |
| 18 | pivotal connector/hinges |
| 19 | trailer tongue |
| 20 | main gate/ramp |
| 21 | lower edge portion |
| 22 | side portion |
| 23 | side portion |
| 24 | upper edge portion |
| 25 | horizontal beam, lower |
| 26 | vertical beam |
| 27 | recess/cut out portion/opening |
| 28 | horizontal beam, lower |
| 29 | pivotal connection/hinge |
| 30 | auxiliary gate |
| 31 | horizontal beam, upper |
| 32 | horizontal beam, upper |
| 33 | vertical beam |
| 34 | main gate/ramp latch |
| 35 | auxiliary gate latch |
| 36 | sheet of expanded metal |
| 37 | opened position |
| 38 | closed position |
| 39 | portion of elongated articles |
| 40 | elongated article (lumber, pipe, tubing, etc.) |
| 41 | horizontal beam, midde |
| 42 | lock |
| 43 | handle |
| 44 | keeper |
| 45 | cover |
| 46 | pin |
| 47 | plate |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A utility trailer apparatus, comprising:
   a) a trailer chassis having a central longitudinal axis, one or more axles, multiple wheels attached to said one or more axles, a bed area having a front edge portion, rear edge portion and opposed left and right side edge portions, said bed area having a load carrying surface, each said side edge portion having an elevated side portion;
   b) wherein said bed area has a bed length and a bed width;
   c) a main gate movably attached to said chassis at said rear edge portion of said bed area, said main gate movable between elevated and lowered positions, wherein in said elevated position said main gate is attachable to one or both of said elevated side portions, said main gate having upper and lower edge portions and left and right gate side edges;
   d) a cutout portion of said main gate providing a gap or recess for enabling carriage of one or more elongated articles above said load carrying surface and that are longer than said bed length, wherein said gap or recess enables carriage of elongated articles that extend in front of and behind said main gate when the articles occupy said gap or recess, said cutout portion being partially defined by a horizontal beam positioned at a bottom of said cutout portion when said main gate is in the elevated position; and
   e) an auxiliary gate that is smaller than said main gate, said auxiliary gate being movable between an auxiliary gate closed position that covers said gap or recess and an auxiliary gate opened position that enables one or more elongated articles to occupy said gap or recess, said auxiliary gate being pivotally mounted to said cutout portion along a bottom edge of said auxiliary gate through a hinge extending between said bottom edge and said horizontal beam.

2. The utility trailer apparatus of claim 1 wherein said main gate is pivotally attached to said chassis.

3. The utility trailer apparatus of claim 1 wherein said auxiliary gate is spaced inwardly of said left and right side edges.

4. The utility trailer apparatus of claim 1 wherein said auxiliary gate extends from said main gate upper edge portion a partial distance toward said main gate lower edge portion.

5. The utility trailer apparatus of claim 1 wherein said gap or recess is generally rectangular.

6. The utility trailer apparatus of claim 1 further comprising wherein said horizontal beam is a load carrying beam on said main gate below said gap or recess.

7. The utility trailer apparatus of claim 1 wherein said gap or recess is positioned at said central longitudinal axis.

8. The utility trailer apparatus of claim 1 wherein said auxiliary gate is elevated above said load carrying surface.

9. A utility trailer apparatus, comprising:
   a) a trailer chassis having a frame and a load carrying bed, the frame having a front end portion, a rear end portion and side walls;
   b) a main gate having a lower end, a top end and side ends, wherein the main gate lower end is pivotally connected to the trailer rear end portion and can be moved between an elevated position and a lowered position;

c) wherein the main gate has a height that extends higher than the trailer side walls;

d) a cut out portion provided at the top end of said main gate that enables carriage of articles that are positioned above said load carrying bed and wherein the articles extend past the trailer rear end portion;

e) an auxiliary gate that is removably connectable to the main gate and can be moveable between opened and closed positions, and wherein the auxiliary gate covers the cut out portion when placed in the closed position; and f) wherein the articles extend through the cut out portion when the auxiliary gate is in the opened position.

10. The utility trailer apparatus of claim 9 wherein said auxiliary gate is spaced inwardly of said main gate side ends.

11. The utility trailer apparatus of claim 9 wherein said auxiliary gate extends from said main gate top end a partial distance toward said main gate lower end.

12. The utility trailer apparatus of claim 9 wherein said auxiliary gate is pivotally attached to said main gate along a bottom edge of said auxiliary gate.

13. The utility trailer apparatus of claim 9 wherein said cut out portion is generally rectangular.

14. The utility trailer apparatus of claim 9 further comprising a load carrying beam on said main gate at the bottom of said cut out portion.

15. The utility trailer apparatus of claim 9 wherein said auxiliary gate is elevated above said load carrying bed.

16. A utility trailer apparatus, comprising:

a) a trailer chassis having one or more axels having wheels, a frame and a load carrying bed, the frame having a front end portion, a rear end portion and side walls;

b) a main gate having a lower end, a top end and side ends, wherein the main gate lower end is pivotally connected to the trailer rear end portion and can be moved between an elevated position and a lowered position;

c) an opening provided at the top end of said main gate that enables carriage of articles that are positioned above said load carrying bed and wherein the articles extend past the trailer rear end portion; and d) an auxiliary gate that is connected to the main gate and can be pivotally moved between opened and closed positions, and wherein the auxiliary gate covers the opening when placed in the closed position, said auxiliary gate having a bottom edge when said main gate is in the elevated position and the auxiliary gate is in the closed position, said auxiliary gate being pivotally mounted to said main gate through a hinge coupled to said bottom edge of said auxiliary gate and coupled to said opening.

17. The utility trailer apparatus of claim 16 wherein said auxiliary gate extends from said main gate top end a partial distance toward said main gate lower end.

18. The utility trailer apparatus of claim 16 further comprising a load carrying beam on said main gate at the bottom of said opening.

* * * * *